United States Patent
Underseth et al.

[11] Patent Number: 6,044,486
[45] Date of Patent: Mar. 28, 2000

[54] METHOD AND DEVICE FOR MAJORITY VOTE OPTIMIZATION OVER WIRELESS COMMUNICATION CHANNELS

[75] Inventors: Mark Underseth, Carlsbad, Calif.; Nobusuke Matsuoka, Kashiwa, Japan

[73] Assignee: Uniden America Corporation, Fort Worth, Tex.

[21] Appl. No.: 08/929,151

[22] Filed: Sep. 11, 1997

[51] Int. Cl.$^7$ .............................. G06F 11/10; H03M 13/12
[52] U.S. Cl. ................................. 714/797; 714/760
[58] Field of Search ................. 371/36, 37.9; 307/464; 714/797, 760

[56] References Cited

U.S. PATENT DOCUMENTS

| | | | |
|---|---|---|---|
| 4,654,867 | 3/1987 | Labedz et al. | 379/59 |
| 4,675,863 | 6/1987 | Paneth et al. | 370/50 |
| 4,876,740 | 10/1989 | Levine et al. | 455/33 |
| 4,912,756 | 3/1990 | Hop | 379/60 |
| 4,984,290 | 1/1991 | Levine et al. | 455/33 |
| 5,020,132 | 5/1991 | Nazarenk et al. | 455/17 |
| 5,081,679 | 1/1992 | Dent | 380/48 |
| 5,091,942 | 2/1992 | Dent | 380/46 |
| 5,119,375 | 6/1992 | Paneth et al. | 370/95.1 |
| 5,121,391 | 6/1992 | Paneth et al. | 370/95.1 |
| 5,235,220 | 8/1993 | Takizawa | 307/464 |
| 5,241,548 | 8/1993 | Dillon et al. | 371/69.1 |
| 5,384,828 | 1/1995 | Brown et al. | 379/61 |
| 5,404,392 | 4/1995 | Miller et al. | 379/60 |
| 5,457,680 | 10/1995 | Kamm et al. | 370/17 |
| 5,479,397 | 12/1995 | Lee | 370/18 |
| 5,572,620 | 11/1996 | Reilly et al. | 395/182.09 |
| 5,742,618 | 4/1998 | Lowe | 371/36 |

*Primary Examiner*—Phung M. Chung
*Attorney, Agent, or Firm*—Knobbe, Martens, Olson & Bear LLP

[57] ABSTRACT

A method and device for error-correcting a plurality of bits transmitted over RF channels in a cellular communication system are provided. The present invention applies principles of majority voting to error-correct a plurality of bits in a message word simultaneously. Further, the present invention applies its error-correction capability to virtually any number of repeat transmissions over forward and reverse control/voice channels. Following synchronization of the transmit and receive stations, a message word having n-bits is transmitted repeatedly. The repeat bits are separated and analyzed whereafter the true logical state of the original n-bits is determined. The originally transmitted message word is then reconstructed based upon the determined true logical state of the n-bits.

25 Claims, 4 Drawing Sheets

METHOD AND DEVICE FOR MAJORITY VOTE OPTIMIZATION OVER WIRELESS COMMUNICATION CHANNELS

BACKGROUND OF THE INVENTION

1. Field of the Invention

The present invention relates generally to the field of wireless communication of voice and data information. More particularly, the present invention relates to correction of errors in bits transmitted over radio frequency ("RF") channels, and has specific application to cellular telephone systems.

2. Background of the Related Art

In North America, cellular systems using analog voice must meet the Advanced Mobile Phone System ("AMPS") standard, now defined by the Electronics Industries Associate ("EIA") specification EIA-553. Analog systems typically use analog frequency modulation ("FM") for speech transmission and frequency shift keying ("FSK") for signalling (i.e. control messages). In the United States, the AMPS uses frequency ranges of 824–849 MHz for mobile station transmissions, and 869–894 MHz for base station transmissions. The channel spacing is 30 KHz, and the number of channels is 832.

Cellular systems using digital communications must meet the EIA/TIA North American digital cellular system ("TDMA") standard. The EIA/TIA IS-54 is the standard deployed in the cellular markets in the United States. Other standards such as the EIA/TIA IS-95 and IS-136 are also used. The IS-54 uses a bit rate of 48.6 kbps, a bandwidth of 30 KHz, and a time slot duration of 6.7 ms. Each 30-KHz bandwidth can support up to three users simultaneously (using TDMA access scheme). Each user transmits voice information at 7.95 kbps using vector sum excited linear predictive ("VSELP") speech coder (13.0 kbps with error code protection). Equivalent international digital telephone system standards include GSM (for Europe) and PDC (for Japan).

Although they have different standards, both analog and digital systems still share a common communication medium by using RF signals to carry their respective information. One of the inherent characteristics of radio channels is that signal fading due to time-variant multipath propagation often causes the signal to fall below the noise level, thus resulting in a large number of errors (burst errors). One effective method of dealing with burst errors in a channel has been to interleave the coded data. Interleaving spreads out the data in time so that errors within a codeword appear to be independent. In other words, the output of the channel encoder is interleaved over two separate time slots with the speech data of adjacent frames. While it has proven to be helpful in reducing the probability of erred bits, interleaving is by no means a complete defense in combatting the adverse effects of multipath fading.

Another method applied in an effort to overcome the multipath fading effects is the use of a bit error correction method. One such error correction method is the so-called majority vote. In a typical majority vote method, a bit is transmitted n-times over an RF channel from a transmit station (e.g. base station) to a receive station (e.g. mobile station). At the receive station, the true logical state of the bit is determined by simply taking the majority of the repeated bits. If, for example, a bit having a logical state of "1" is transmitted five times, and the corresponding received bits have logical states of: 1, 1, 1, 0, and 0, then, based on the majority vote, the true logical state of the received bit is determined to be "1." The problem with this basic approach is the time delay imposed upon each transmitted message due to the necessary processing time. More particularly, the basic majority vote method lacks the ability to process a number of different original bits simultaneously. Hence, the basic approach fails to provide a method to efficiently utilize a typical n-bit (e.g. 16 or 32) microprocessor. Instead, an n-bit microprocessor processes each set of repeat bits sequentially using a multiple number of clock cycles. Therefore, there is a need in the technology to error-correct and process a plurality of different original bits over wireless communication channels simultaneously. The method for accomplishing this form of error correction should implement a majority vote algorithm while maintaining an acceptable bit processing speed and microprocessor efficiency.

SUMMARY OF THE INVENTION

The present invention provides a method and system for error-correcting bits of voice and data messages over RF channels with particular application to cellular telephone systems. The present invention applies the principles of majority voting with the ability to error-correct and process a plurality of different original bits simultaneously. In one embodiment, the invention applies a MVote-5 method wherein the transmission of a bit is repeated five times, the number of bit pairs and cancels are determined and, depending on the presence of pairs and/or cancels, the true logical state of the original bit is determined. In another embodiment, the invention applies a MVote-11 method wherein the transmission of a bit is repeated eleven times, the MVote-5 method is applied to the first ten bits separately and, depending on the outcome of the MVote-5 on the first ten bits, the true logical state of the original bit is determined. The method and system of the present invention may be applied to error-correct virtually any number of repeat bits over a communication channel.

In a communication system having a transmit station and a receive station including at least one processor, the present invention provides a method of error-correcting a plurality of original bits of a message word. The method comprises the steps of receiving the plurality of original bits from the transmit station multiple times as a plurality of repeat sets at the RX station. The method further comprises the step of instructing the at least one processor to execute at least one majority vote upon the plurality of repeat sets substantially simultaneously. Instructing the processor may include executing at least one majority vote upon a first repeat set corresponding to a first original bit substantially simultaneously with at least another repeat set corresponding to another original bit which is adjacent to the first original bit.

BRIEF DESCRIPTION OF THE DRAWINGS

The above and other advantages of the present invention will be apparent upon consideration of the following detailed description, taken in conjunction with the accompanying drawings, in which.

DETAILED DESCRIPTION OF THE INVENTION

The invention provides a method and system to simultaneously error-correct and process a plurality of different bits transmitted over wireless communication channels. The method of the invention is applicable to a variety of cellular communication system standards including, without limitation, the IS-54 (Time Division Multiple Access—TDMA), IS-95 (Code Division Multiple Access—CDMA), IS-136 (TDMA), and GSM (Global System for Mobile Communications). It is important to note, however, that the method of the present invention is applicable to virtually all wireless communications where repeat transmissions are desirable. To better understand the applicability of the present invention, a brief overview of the components and operation of a typical cellular communication system is first provided.

Figure 1:
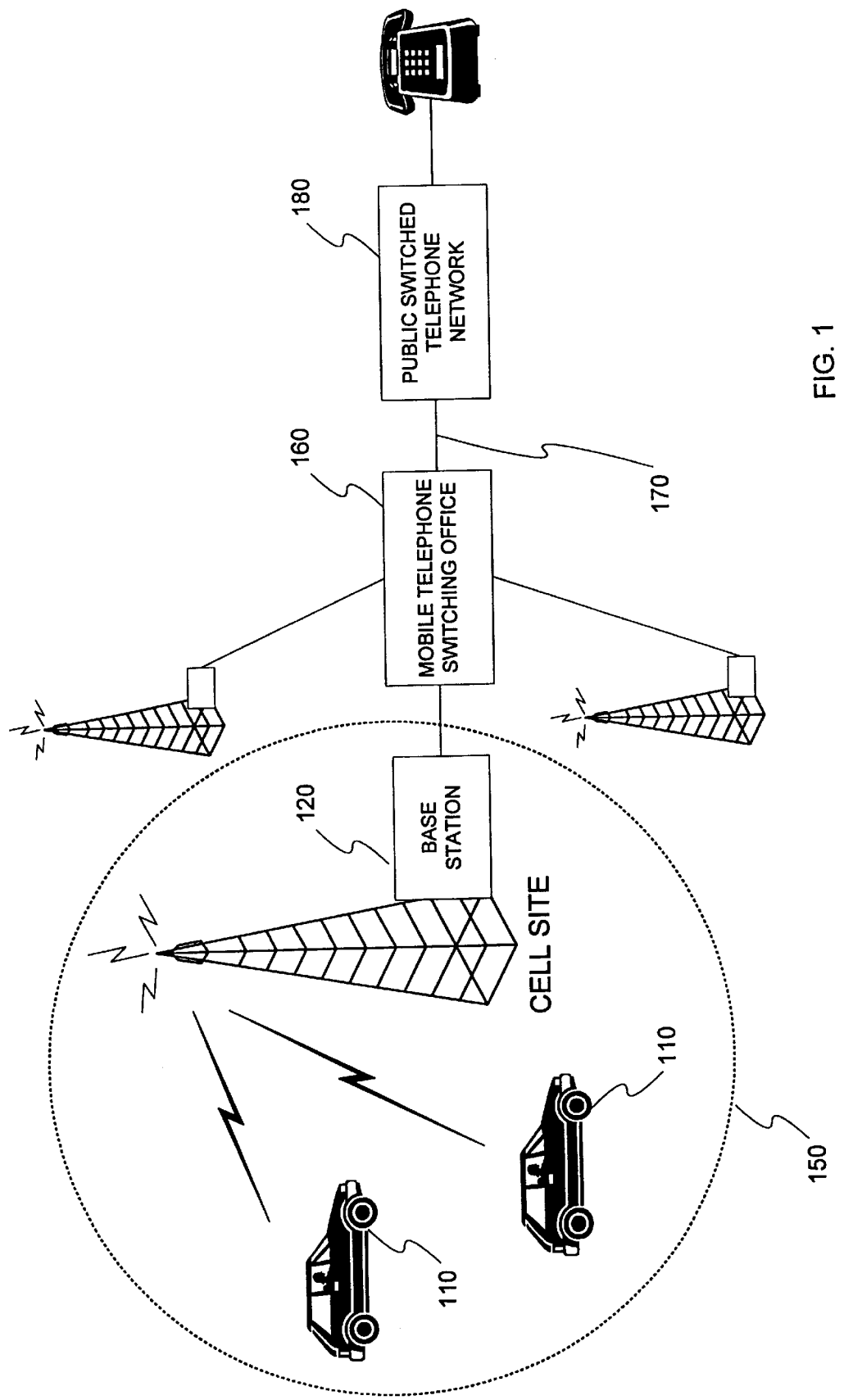
FIG. 1 is an illustrative diagram of a typical cellular telephone network comprising a base station and two or more mobile stations.

FIG. 1 is an illustrative diagram of a typical cellular telephone network comprising a base station and two or more mobile stations. There are three basic elements in a cellular communication network 100: (1) one or more mobile stations 110 ("MS"); (2) one or more base transceiver stations 120 ("BTS"); and (3) one or more mobile telephone switching centers 160 ("MSC"). These elements are essential for any cellular wireless access to the wired public networks 180, including both the public switched telephone network ("PSTN") and the integrated services digital network ("ISDN"). The MS 110 is typically equipped with a transceiver 130 which comprises radio equipment such as a transmitter, a receiver, and other processing hardware specific to the radio interface. Similarly, the BTS 120 is equipped with a transceiver (not shown in this figure) which typically comprises radio equipment such as a transmitter, a receiver, and other processing equipment specific to the radio interface. Each BTS 120 provides the wireless communication to and from at least one MS 110 in its cell 150 (i.e. coverage area), and links the MS 110 with the switching centers in the MSC 160. A number of users (e.g. MS 110) in a cell 150 communicate with that cell's BTS 120, which in turn communicates to the rest of the world, via the MSC 160 through copper or fiber lines 170. The MSC 160, in turn, provides switching functions in the system which takes care of connections with the wired public networks 180. The MSC 160 also interfaces and accommodates for the differences between the protocols and transmission rates of EIA-553 (or IS-54) on one hand and those of public networks 180 on the other hand. In addition to the switching functions, the MSC 160 allocates radio resources and performs the handoff of calls from one cell 150 to another as mobile users move through the service area.

Figure 2:
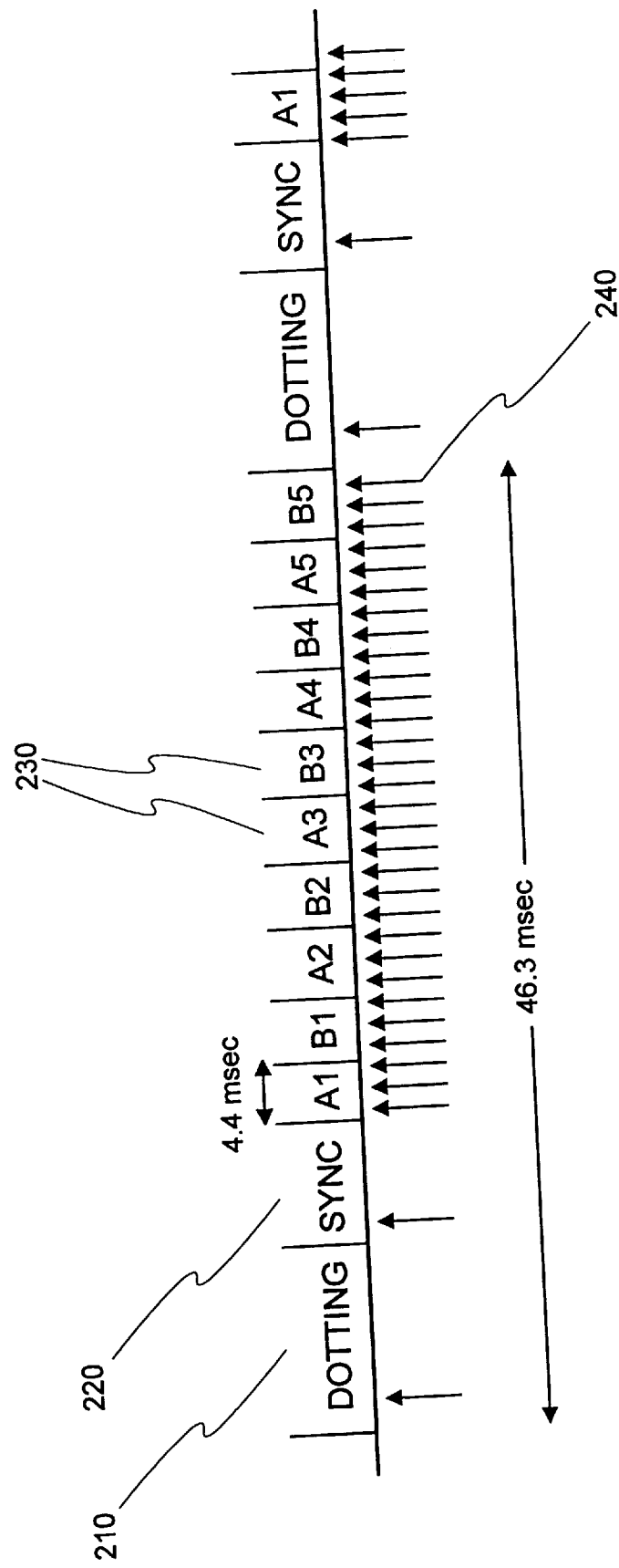
FIG. 2 is a block diagram of an exemplary bit transmission stream as transmitted over a communication channel.

Now referring to FIG. 2, a block diagram of an exemplary bit transmission stream over a Forward Control Channel ("FCC") is provided. To establish and maintain synchronization between the MS 110 and BTS 120 (not shown in this figure), the transmit station (e.g. BTS 120) transmits a dotting sequence 210 and a synchronization word 220 to the receive station (e.g. MS 110). The FCC sends information by Frequency Shift Keying ("FSK") at a rate of 10 kbps. For synchronization, the information is Manchester encoded, forcing a frequency shift (bit transition) for each bit input. The dotting sequence 210 is typically a 10-bit sequence of alternating 1's and 0's sent to indicate that a message is about to begin. The alternating bits produce a strong, easily-detected 5 kHz frequency component. The synchronization word 220 follows the dotting sequence 210 to define the exact starting point of the coming message. A typical synchronization word 220 is preferably comprised of the following bits: 111000100010. Two message words A and B (230) follow the synchronization word 220 in an alternating fashion. Typically, a message word 230 transmitted over the FCC comprises a total of 40 bits. Due to bit errors resulting from RF channel fading, however, the message words 230 are repeated 5 times to ensure reliability. Hence, on the FCC, a total of ten message words follow the synchronization word 220. Message words 230 are alternated A, B, A, B, A, B, etc. "A" and "B" words are allocated among the different MS 110—e.g. "A" words are designated for MS 110 with even phone numbers, and "B" words are designated for MS 110 with odd phone numbers. To help coordinate multiple MS 110 accessing the system, busy/idle indicator bits 240 are interlaced with the other bits. Before a MS 110 attempts access, it checks the busy/idle bits to see if the FCC is serving another MS 110.

Referring again to FIG. 2, the method of the present invention enables the MS 110 to error-correct a plurality of bits $B_n$ (where n is the number of bits to be processed simultaneously). Note that, in the present embodiment, n is 40 bits because the size of the message word A (and B) 230 is 40 bits. Nonetheless, using the error-correction method of the present invention, the number of bits n may virtually be any number of bits. Hence, in order for the MS 110 to receive the original bits $B_1$–$B_{40}$ for each word A (and B) 230, each bit is repeatedly transmitted from the BTS 120. In this embodiment, each bit of the sequence $B_n$ is transmitted five times. Hence, for each word message A (and B) 230, the MS 110 receives the following bit sequence: $b1_1$–$b1_{40}$, $b2_1$–$b2_{40}$, $b3_1$–$b3_{40}$, $b4_1$–$b4_{40}$, and $b5_1$–$b5_{40}$, where $b1_n$, $b2_n$, $b3_n$, $b4_n$, and $b5_n$ are simply the repeat bits for the original bit $B_n$. In an alternating fashion, the entire process is re-executed for the MS's 110 which use the allocated message words B. Note that, if the sequence $B_n$ were to be transmitted only once, a different logical state for the sequence $B_n$ may end up being received by the receiving station MS 110 because of the multipath fading effect often experienced by RF signals. At the receiving station MS 110, the MS 110 must now determine which bit (of the $b1_n$, $b2_n$, $b3_n$, $b4_n$, and $b5_n$) contains the true logical state of the original bit $B_n$. By applying the method of the present invention, the receiving station MS 110 determines the true logical state of the original bits $B_n$ without reference to the transmit station BTS 120.

Figure 3:
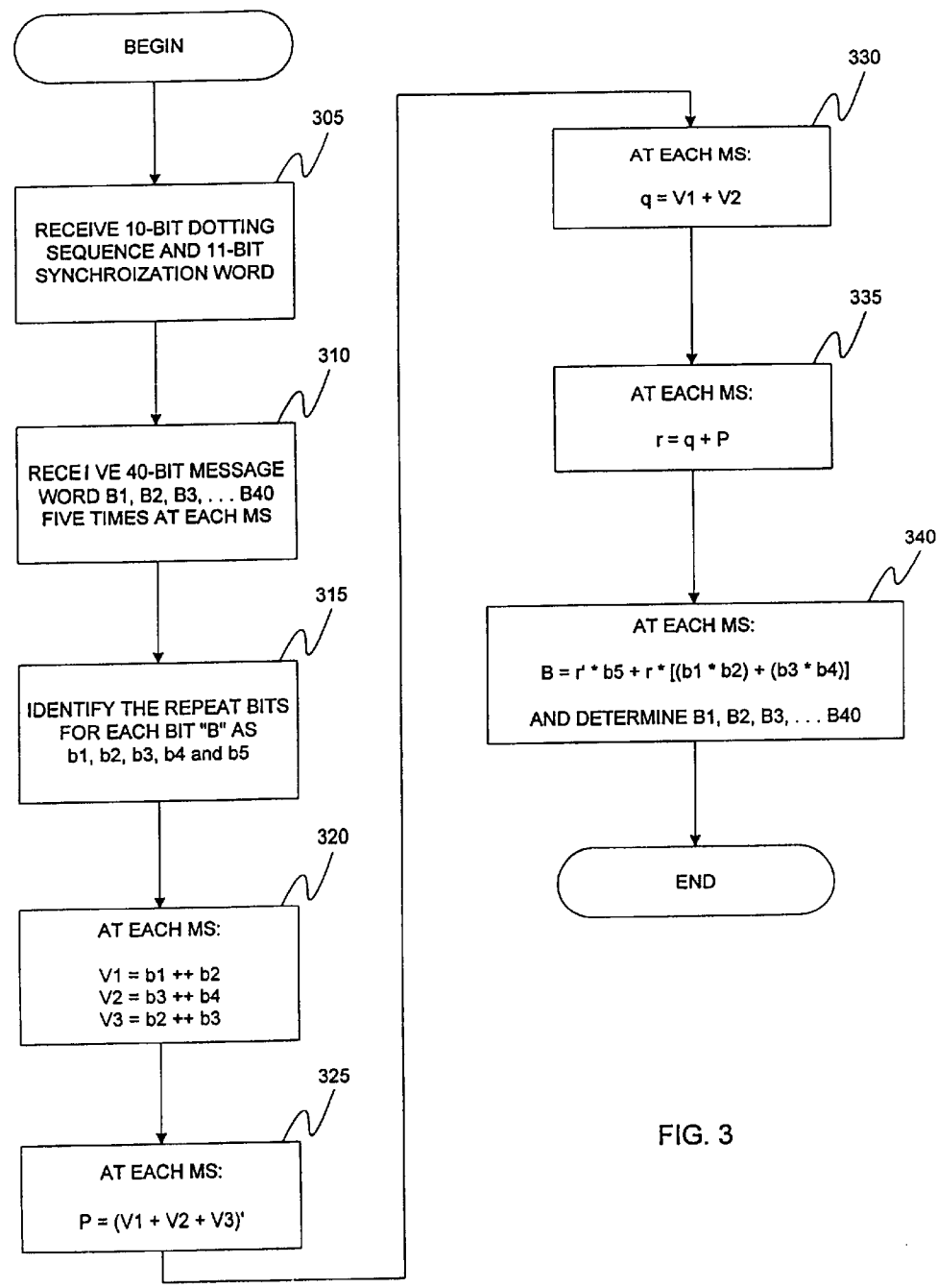
FIG. 3 is a flow chart illustrating the steps applied to error-correct any number of bits simultaneously using an MVote-5 method of the invention.

In one embodiment of the invention, a majority vote-5 ("MVote-5") error-correction method is implemented. FIG. 3 is a flow chart illustrating the steps applied to error-correct different bits simultaneously using the MVote-5 method of the invention. The method of the invention is implemented over the FCC described in FIG. 2. However, the method is not limited to the FCC, but is also implemented over a reverse control channel ("RCC") and a reverse voice channel ("RVC"). "Reverse" indicates a transmission from the MS 110 to the BTS 120. In contrast with the FVC, on the RCC and RVC, 48-bit words are repeated five times following the dotting sequence.

As shown in FIG. 3, at step 305, each receive station (e.g. a mobile station MS 110) receives preferably a 10-bit dotting sequence 210 and an 11-bit synchronization word 220 from a transmit station (e.g. a BTS 120) to establish and maintain synchronization. At step 310, each MS 110 receives the 40-bit message $B_n$ (B1, B2, B3, . . . , B40) for the word A (or B) 230. The bit sequence $B_n$ is transmitted repeatedly five times to each MS 110. At step 315, for each original bit of the sequence $B_n$, the MS 110 identifies the repeat bits $b1_n$, $b2_n$, $b3_n$, $b4_n$, and $b5_n$ for analysis. For simplicity, "n" is eliminated from the flow chart of FIG. 3. However, it will be understood by those having ordinary skill in the art that the method described in the flow chart of FIG. 3 applies to any number of bits "n." Moreover, in applying the method of the present invention, the message word A may comprise any number of bits "n." As discussed in the previous section, the repeat bits of message word A are received by only those MS 110 stations which are designated as "A" stations. Similarly, the repeat bits of message word B are received by only those MS 110 stations which are designated as "B" stations. The method of the invention is applied in an identical manner at each MS 110 irrespective of the MS 110 designation.

For each original bit $B_n$ having a logical state "1" or "0," the MS 110 must determine which bit (of the $b1_n$, $b2_n$, $b3_n$, $b4_n$, and $b5_n$) represents the true logical state of the original bit $B_n$. Due to the inherent characteristics of radio signal propagation, the logical state of these repeat bits is often altered from "1" to "0" or from "0" to "1" after transmission. Accordingly, the logical state of the repeat bits will not necessarily be identical to the true logical state of the original bit $B_n$. Therefore, at step 320 the number of bit pairs and number of bit cancels are first determined by calculating the value of the parameters $v1_n$, $v2_n$, and $v3_n$, as follows:

$$v1_n = b1_n ++ b2_n;$$

$$v2_n = b3_n ++ b4_n; \text{ and}$$

$$v3_n = b2_n ++ b3_n,$$

where "++" represents an exclusive-OR operation

As noted above, for simplicity, "n" is eliminated from the flow chart of FIG. 3. A bit pair is defined as the two bits which have identical values (i.e. logical states). For example, $b1_n$ and $b2_n$ would form a bit pair if $b1_n$ and $b2_n$ are both "0," or if $b1_n$ and $b2_n$ are both "1." On the other hand, a bit cancel is defined as the two bits which have different values. For example, $b3_n$ and $b4_n$ would form a bit cancel if $b3_n$ is a "0" and $b4_n$ is a "1," or if $b4_n$ is a "1" and $b4_n$ is a "0." Hence, if $v1_n=0$, then the bits $b1_n$ and $b2_n$ are identical. If $v1_n=1$, then the bits $b1_n$ and $b2_n$ are different. Each operation (e.g., determining $v1_n$) is performed simultaneously on all "n" bits, limited only by the processing capacity of the processing device. Typically, a microprocessor performs binary and/or boolean operations on $v1_1$, $v1_2$, $v1_3$, ..., $v1_s$ simultaneously, where s is the size of the microprocessor's arithmetic logic unit (ALU) which is preferably 16 bits wide or greater. At step 325, the presence of any matching pairs and/or cancels is determined by calculating the value of a parameter $P_n$ as follows:

$$P_n = (v1_n + v2_n + v3_n)',$$

where "+" represents an OR operation, and " ' " represents a NOT operation

As noted above, "n" is eliminated from the flow chart of FIG. 3 for simplicity. Note that if $P_n=1$, then the repeat bits $b1_n$, $b2_n$, $b3_n$, and $b4_n$ were received having identical values at the MS 110 (because $v1_n=v2_n=v3n=0$). If so, then the true logical state of an originally transmitted bit B is identical to any of the $b1_n$, $b2_n$, $b3_n$, or $b4_n$ bits. Each operation (e.g., determining $v1_n+v2_n$) is performed simultaneously on all "n" bits, limited only by the processing capacity (ALU size) of the processing device. At step 330, a determination is made as to which bit pairs disagree by calculating the value of a parameter q as follows:

$$q_n = v1_n ++ v2_n$$

If $q_n=1$, then one of $v1_n$ and $v2_n$ is a bit pair and the other is a bit cancel (note that the true logical state of the original bit $B_n$ would be the logical state of one of the bit pairs). If, however, q=0, then v1 and v2 are bit cancels or are bit pairs. As illustrated at step 335, whether the bit b5 is to be used as a tie breaker must be determined by calculating the value of a mask parameter r as follows:

$$r_n = q_n + P_n$$

If r=0, then b5 must be used as a tie breaker and, accordingly, the true logical state of the original bit "b" is b5. Finally, the true logical state of original bit "b" is determined in step 340 by incorporating all the parameters pursuant to the following equation:

$$B_n = r_n' * b5_n + r_n * [(b1_n * b2_n) + (b3_n * b4_n)],$$

where "*" represents a logical AND operation

As indicated in the previous sections, using the method of the present invention, a plurality of bits $B_n$ are error-corrected simultaneously. The simultaneous characteristic of the present method includes the ability to instruct the processor to concurrently perform each operation upon the plurality of original bits $B_n$ in parallel. More particularly, such instruction enables the processor to concurrently perform each operation upon each repeat bit for all the original bits $B_n$ in parallel. The simultaneous processing of the plurality of bits $B_n$ is limited only by the processing capacity of the processor used at the MS 110.

Figure 4:
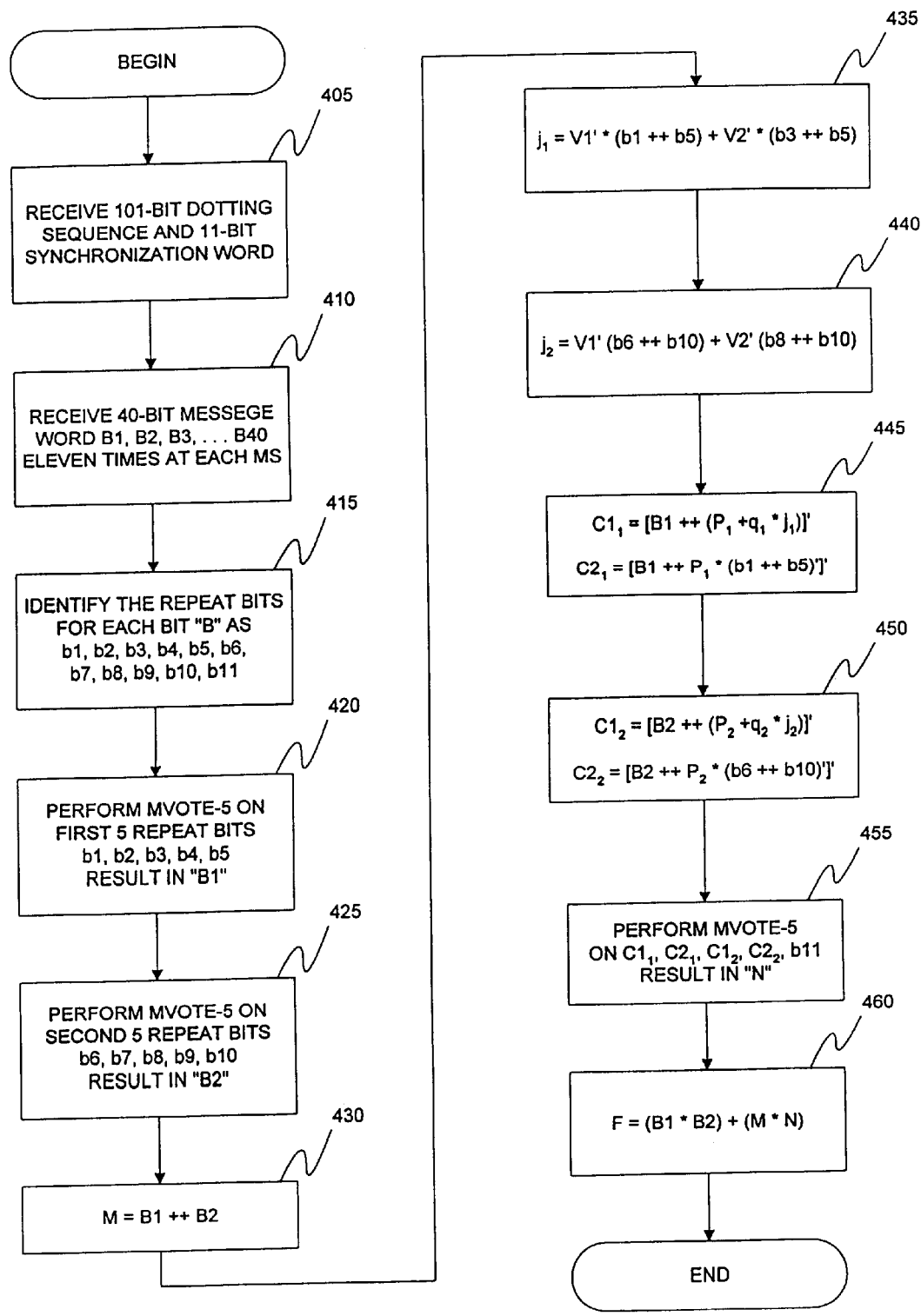
FIG. 4 is flow chart illustrating the steps applied to error-correct any number of bits simultaneously using an MVote-11 method of the invention.

In another embodiment of the invention, a majority vote-11 ("MVote-11") error-correction method is implemented. FIG. 4 is a flow chart illustrating the steps applied to error-correct a plurality of received bits simultaneously using the MVote-11 method. For this embodiment, it is assumed that a Forward Voice Channel ("FVC") is used to communicate the information. In principle, an analog FVC passes user information (e.g. voice information) between a MS 110 and a BTS 120. Signalling information must also be sent to provide physical layer control. When signaling data is about to be transmitted on the FVC, audio FM signals are inhibited and replaced with digital messages. This voice interruption is usually too short (e.g. 34–54 msec.) to be noticed by the listener. To alert the receive station (e.g. MS 110) that a digital signaling message is about to be transmitted, a dotting sequence 210 having 101 bits is sent preceding the message. After the dotting sequence 210, a synchronization word 220 having 11 bits follows to identify the exact start of the message. On the FVC, messages are repeated 11 times to ensure control information is reliable even in poor radio conditions.

Now referring to FIG. 4, at step 405 the transmit station (e.g. BTS 120) transmits a 101-bit dotting sequence 210 and an 11-bit synchronization word 220 to a receive station (e.g. MS 110) to establish synchronization. At step 410, the MS 110 receives the message word 230 (having bits $B_n$) eleven times from the BTS 120. Hence, as shown in step 415, for each original bit $B_n$, the MS 110 receives $b1_n$, $b2_n$, $b3_n$, $b4_n$, $b5_n$, $b6_n$, $b7_n$, $b8_n$, $b9_n$, $b10_n$, and $b11_n$. In fact, for each message word 230, the MS 110 receives a total of 11×n-bits (in this embodiment, n=40). At step 420, the MS 110 performs a first MVote-5 application upon the first five repeat bits: $b1_n$, $b2_n$, $b3_n$, $b4_n$, and $b5_n$. The result of the first MVote-5 application is assigned to a new variable $B1_n$. Similarly, at step 425 the MS 110 performs a second MVote-5 application upon the second five repeat bits $b6_n$, $b7_n$, $b8_n$, $b9_n$, and $b10_n$. The result of the second MVote-5 application is assigned to another variable $B2_n$.

At step 430, the outcomes of the first MVote-5 ($B1_n$ in step 420) and second MVote-5 ($B2_n$ in step 425) applications are checked to determine if they are identical by determining a new parameter $M_n$ as follows:

$$M_n = B1_n + + B2_n$$

As noted above, "n" represents the bit number in the originally transmitted message word 230. Again, "n" is eliminated from the flow chart for simplicity. If $M_n=0$, then $B1_n$ and $B2_n$ are identical and, hence, the true logical state of the original bits $B_n$ is $B1_n$ (or $B2_n$). If, however, $M_n=1$, then $B1_n$ and $B2_n$ are not identical. If the majority votes do not agree, then a new MVote-5 is necessary. More particularly, for each MVote-5 application, there exist at least three repeat bits with logical states 0s or 1s. For each MVote-5, it is necessary to determine whether the remaining two repeat bits match the three repeat bits with the logical states 0s or 1s. For instance, if $b1_n$, $b2_n$, and $b3_n$ were 0s, then whether b4 is a 0 or 1, and whether $b5_n$ is a 0 or 1 shall be determined. After determining the values for the remaining two repeat bits for each majority vote, a new MVote-5 is applied to the remaining two bits of each MVote-5 and $b11_n$ as described below.

At step 560, the value of a new parameter $j1_n$ for the first MVote-5 application is determined as follows:

$$j1_n = [(v1_1)_n{}'*(b1_n + + b5_n)'] + [(v2_1)_n{}'*(b3_n + + b5_n)']$$

where $j1_n$, $(v1_1)_n$, and $(v2_1)_n$ are the respective parameters for the first MVote-5 application. Similarly, at step 440, another parameter $j2_n$ for the second MVote-5 application is determined as follows:

$$j2_n = [(v1_2)_n{}'*(b6_n + + b10_n)'] + [(v2_2)_n{}'*(b8_n + + b10_n)']$$

where $j2_n$, $(v1_1)_n$, and $(v2_2)_n$ are the respective parameters for the second MVote-5 application. Note that, for each MVote application, $v1_n$ or $v2_n$ indicate if a pair exists, and the value of $j_n$ is valid only when $q_n=1$. For each MVote application, the parameter $j_n$ is used to determine whether the fifth repeat bit from each set (i.e., $b5_n$ or $b10_n$) matches a previous pair. Accordingly, as shown in steps 445, to determine the logical states of the remaining two repeat bits (e.g., $b4_n$ and $b5_n$) in relation to the logical state of the previous three repeat bits (e.g., $b1_n$, $b2_n$, and $b3_n$) for the first MVote-5, two new count parameters $(C1_1)_n$ and $(C2_1)_n$ are determined as follows:

$$(C1_1)_n = [B1_n + + (P1_n + q1_n * j1_n)]'$$

$$(C2_1)_n = [B1_n + + P1_n * (b1_n + + b5_n)']'$$

where P1 and q1 are the respective parameters for the first MVote-5 application. For the nth bit, the count parameter $(C1_1)_n$ determines whether there are four bits with identical logical states (i.e., 0s or 1s) for the first MVote-5 and, hence, whether matching pairs are present. Whereas the count parameter and $(C2_1)_n$ determines whether there are five bits with identical logical states for the first MVote-5 and, hence, whether all repeat bits ($b1_n$, $b2_n$, $b3_n$, $b4_n$, and $b5_n$) have identical logical states. Similarly, at step 450, to determine the logical state of the remaining two repeat bits (e.g., $b9_n$ and $b10_n$) in relation to the logical state of the previous three repeat bits (e.g., $b6_n$, $b7_n$, and $b8_n$) for the second MVote-5, two count parameters $(C1_2)_n$ and $(C2_2)_n$ are determined as follows:

$$(C1_2)_n = [B2_n + + (P2_n + q2_n * j2_n)]'$$

$$(C2_2)_n = [B2_n + + P2_n * (b6_n + + b10_n)']'$$

where P2 and q2 are the respective parameters for the second MVote-5 application. For each nth bit, the count parameter $(C1_2)_n$ determines whether there are four bits with identical logical states (i.e., 0s or 1s) for the second MVote-5 and, hence, whether matching pairs are present. Whereas the count parameter and $(C2_2)_n$ determines whether there are five bits with identical logical states (i.e., 0s or 1s) for the second MVote-5 matches and, hence, whether all repeat bits ($b6_n$, $b7_n$, $b8_n$, $b9_n$, and $b10_n$) have identical logical states.

The values of $C1_n$ and $C2_n$ are used in the final step to determine to what extent, if any, the repeat bits $b1_n \ldots b5_n$ and $b6_n \ldots b10_n$ should be weighed, and whether the eleventh repeat bit $b11_n$ should be used in reaching the true logical state of the original bit $B_n$. At step 455, a new MVote-5 is applied on five newly identified bits which are as follows:

$$N_n = \text{Outcome of MVote-5 } [C1_1, C2_1, C1_2, C2_2, b11]_n$$

To illustrate the reasons behind performing a final MVote-5 on the above bits, reference is made to the previous example where $b1_n$, $b2_n$, and $b3_n$, are all 0s, with the assumption that $b6_n$, $b7_n$, and $b8_n$ are all 1s. In other words, as an example, the received eleven repeat bits may be as follows:

$$0,0,0,b4_n, b5_n, 1,1,1,b9_n, b10_n, b11_n$$

In such a case, the bits which are determinative of the true value of the original bit $B_n$ are the following: $b4_n$, $b5_n$, $b9_n$, $b10_n$, and $b11_n$. If so, a new MVote-5 is applied on these determinative bits. The result of this MVote-5 application is assigned to a new parameter $N_n$. Finally, at step 460, the true value $F_n$ of the original bit $B_n$ is determined using the following equation:

$$F_n = [M_n{}'*(B1_n * B2_n)] + (M_n * N_n) = (B1_n * B2_n) + (M_n * N_n)$$

The foregoing determination accounts for the outcomes of all prior logical steps to determine the logical state of $B_n$ bits simultaneously. Accordingly, the true logical state of the original bits $B_n$ of a message word 230 are determined at each receive station MS 110. Using the MVote-11 method of the present invention, the MS 110 error-corrects and processes all $B_n$ bits simultaneously.

In view of the foregoing, it will be appreciated that the present system and method overcome the longstanding need in the industry for an efficient bit error-correction by providing a method and system to simultaneously error-correct and process a plurality of different bits transmitted over wireless communications channels. The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. In a communication system having a transmit (TX) station and a receive (RX) station including at least one processor, a method of error-correcting a plurality of transmitted bits representing a message word, comprising the steps of:

receiving said plurality of transmitted bits from the TX station multiple times as a plurality of repeat sets at said RX station; and instructing said at least one processor to execute at least one majority vote upon a first repeat set corresponding to a first original bit substantially simultaneously with at least another repeat set corresponding to another original bit which is adjacent to said first original bit.

2. The method as defined in claim 1, wherein the step of instructing said at least one processor further comprises using a first processing bit and at least another processing bit of said at least one processor.

3. The method as defined in claim 1, further comprising the step of reconstructing said message word based on the outcome of said at least one majority vote.

4. The method as defined in claim 1, wherein each of said plurality of repeat sets comprises a plurality of repeat bits received for a bit in the message word.

5. The method as defined in claim 1, wherein each of said plurality of repeat sets comprises a first bit, a second bit, a third bit, a fourth bit, and a fifth bit, which are received at said RX station for a bit in the message word.

6. The method as defined in claim 5, further comprising the step of determining a number of bit pairs and a number of bit cancels among said first bit, second bit, third bit, and fourth bit at said RX station.

7. The method as defined in claim 6, further comprising the step of determining the true logical state of the bit in the message word based upon said number of bit pairs and said number of bit cancels.

8. The method as defined in claim 6, further comprising the step of using said number of bit pairs and said number of bit cancels to determine whether said fifth bit should be examined as a tie breaker.

9. The method as defined in claim 6, further comprising the step of using an exclusive-OR circuit to determine said number of bit pairs and said number of bit cancels.

10. The method as defined in claim 1, wherein the number of bits in each of said plurality of repeat sets is represented by R, and wherein R may be any integer greater than 1.

11. The method as defined in claim 10, wherein R=11 and each of said plurality of repeat sets comprises a first set of bits, a second set of bits, and an eleventh bit, which are received at said RX station for a bit in the message word.

12. The method as defined in claim 11, further comprising the step of applying a first majority vote-5 ("MVote-5") method on said first set of bits.

13. The method as defined in claim 12, further comprising the step of applying a second MVote-5 method on said second set of bits.

14. The method as defined in claim 13, further comprising the step of assessing the outcomes of said first MVote-5 and second MVote-5 applications to determine whether said eleventh bit should be examined as a tie breaker.

15. The method as defined in claim 14, further comprising the step of applying at least one more MVote-5 on a selected set of bits based upon the outcomes of said first MVote-5 and second MVote-5 applications.

16. In a communication system having a transmit (TX) station and a receive (RX) station including at least one processor, a device which error-corrects a plurality of transmitted bits representing a message word, comprising:

means for receiving said plurality of transmitted bits from said TX station multiple times as a plurality of repeat sets at said RX station; and means for instructing said at least one processor to execute at least one majority vote upon a first repeat set corresponding to a first original bit substantially simultaneously with at least another repeat set corresponding to another original bit which is adjacent to said first original bit.

17. The device as defined in claim 16, wherein said instructing means further comprise means for using a first processing bit and at least another processing bit of said at least one processor.

18. The device as defined in claim 16, further comprising means for reconstructing said message word based on the outcome of said at least one majority vote.

19. The device as defined in claim 16, wherein each of said plurality of repeat sets comprises a plurality of repeat bits received for a bit in the message word.

20. In a communication system, a device which error-corrects a plurality of transmitted bits representing a message word having "n" bits, the device comprising:

a receiver configured to receive the plurality of transmitted bits as a plurality of repeat sets, each repeat set having a plurality of repeat bits received for each of the "n" bits; and a processor operationally connected to the receiver and configured to substantially simultaneously execute at least one majority vote upon a first repeat set, corresponding to a first original bit, with at least another repeat set, corresponding to another original bit which is adjacent to the first original bit.

21. The device as defined in claim 20, wherein the processor determines the number of bit pairs and the number of bit cancels among the plurality of bits.

22. The device as defined in claim 21, wherein the processor determines whether a last bit of the plurality of repeat bits should be examined as a tie breaker.

23. The device as defined in claim 20, wherein the plurality of repeat bits comprises a first set of bits having five bits, a second set of bits having five bits, and an eleventh bit, which are received for each of the "n" bits.

24. The device as defined in claim 23, wherein the processor performs a first majority vote-5 (MVote-5) on the first set of bits, and a second MVote-5 on the second set of bits.

25. The device as defined in claim 24, wherein the processor determines, based on the outcomes of the first and second MVote-5, whether to examine the eleventh bit as a tie breaker.

* * * * *